United States Patent
Shimada et al.

(10) Patent No.: US 9,340,719 B2
(45) Date of Patent: May 17, 2016

(54) WATER/OIL REPELLENT COMPOSITION AND ARTICLE

(71) Applicant: ASAHI GLASS COMPANY, LIMITED, Chiyoda-ku (JP)

(72) Inventors: Minako Shimada, Tokyo (JP); Yuuichi Oomori, Tokyo (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 14/611,817

(22) Filed: Feb. 2, 2015

(65) Prior Publication Data

US 2015/0152304 A1 Jun. 4, 2015

Related U.S. Application Data

(63) Continuation of application No. PCT/JP2013/070512, filed on Jul. 29, 2013.

(30) Foreign Application Priority Data

Aug. 1, 2012 (JP) ................. 2012-171133

(51) Int. Cl.
| | | |
|---|---|---|
| *C09K 3/18* | (2006.01) | |
| *D06M 15/256* | (2006.01) | |
| *C08L 27/08* | (2006.01) | |
| *D06M 15/564* | (2006.01) | |
| *D06M 15/248* | (2006.01) | |
| *D06M 15/263* | (2006.01) | |
| *D06M 15/267* | (2006.01) | |
| *D06M 15/273* | (2006.01) | |
| *D06M 15/277* | (2006.01) | |
| *D06M 15/285* | (2006.01) | |
| *D06M 15/29* | (2006.01) | |
| *D06M 15/333* | (2006.01) | |
| *D06M 15/353* | (2006.01) | |
| *D06M 15/356* | (2006.01) | |
| *D06M 23/10* | (2006.01) | |

(52) U.S. Cl.
CPC .............. *C09K 3/18* (2013.01); *D06M 15/248* (2013.01); *D06M 15/256* (2013.01); *D06M 15/263* (2013.01); *D06M 15/267* (2013.01); *D06M 15/273* (2013.01); *D06M 15/277* (2013.01); *D06M 15/285* (2013.01); *D06M 15/29* (2013.01); *D06M 15/3335* (2013.01); *D06M 15/353* (2013.01); *D06M 15/3562* (2013.01); *D06M 15/3568* (2013.01); *D06M 15/564* (2013.01); *D06M 23/10* (2013.01); *D06M 2200/11* (2013.01); *D06M 2200/12* (2013.01); *Y10T 428/249953* (2015.04); *Y10T 442/2098* (2015.04)

(58) Field of Classification Search
CPC ....... C08L 27/08; C08L 27/12; C08F 214/08; C08F 214/18
USPC ................... 525/200, 239; 524/520
See application file for complete search history.

(56) References Cited

U.S. PATENT DOCUMENTS

| | | | |
|---|---|---|---|
| 6,716,944 | B2 | 4/2004 | Maekawa et al. |
| 6,872,324 | B2 | 3/2005 | Maekawa et al. |
| 7,485,688 | B2 | 2/2009 | Maekawa et al. |
| 7,989,567 | B2 | 8/2011 | Sugiyama et al. |
| 8,193,277 | B2 | 6/2012 | Otozawa et al. |
| 8,609,795 | B2 | 12/2013 | Sugimoto et al. |
| 8,703,864 | B2 | 4/2014 | Shimada et al. |
| 8,853,337 | B2 | 10/2014 | Hirono et al. |
| 8,901,264 | B2 | 12/2014 | Sugiyama et al. |
| 2005/0267241 | A1 | 12/2005 | Sugimoto et al. |
| 2009/0085001 | A1 | 4/2009 | Furuta et al. |
| 2010/0069564 | A1 | 3/2010 | Shimada et al. |
| 2010/0113665 | A1 | 5/2010 | Hirono et al. |
| 2010/0179287 | A1* | 7/2010 | Sugiyama ................. C09K 3/18 525/200 |

(Continued)

FOREIGN PATENT DOCUMENTS

| | | |
|---|---|---|
| JP | 07-229070 | 8/1995 |
| JP | 2009-155591 | 7/2009 |

(Continued)

OTHER PUBLICATIONS

International Search Report issued in PCT/JP2013/070512, dated Oct. 22, 2013.

(Continued)

*Primary Examiner* — Vu A Nguyen
(74) *Attorney, Agent, or Firm* — Oblon, McClelland, Maier & Neustadt, L.L.P

(57) ABSTRACT

It is possible to obtain a porous substrate having a water/oil repellent-treated surface and a moisture-permeable waterproofing film, which has favorable water/oil repellency and wash durability, through which penetration of a coating liquid for formation of the moisture-permeable waterproofing film is suppressed, and from which peeling of the moisture-permeable waterproofing film is suppressed. A water/oil repellent composition comprising a copolymer (A) having from 60 to 95 mass % of units based on a monomer having a $R^F$ group having at most 6 carbon atoms and from 5 to 40 mass % of units based on vinylidene chloride, a copolymer (B) having from 50 to 95 mass % of units based on a halogenated olefin and from 5 to 50 mass % of units based on a monomer having a crosslinkable functional group, and a medium (C), wherein the proportion of the copolymer (A) is from 70 to 90 mass %, and the proportion of the copolymer (B) is from 10 to 30 mass %.

13 Claims, No Drawings

(56) References Cited

U.S. PATENT DOCUMENTS

| | | |
|---|---|---|
| 2011/0039975 A1 | 2/2011 | Hara et al. |
| 2011/0071248 A1 | 3/2011 | Sugiyama et al. |
| 2011/0196067 A1 | 8/2011 | Otozawa et al. |
| 2012/0097882 A1 | 4/2012 | Otozawa et al. |
| 2012/0259045 A1 | 10/2012 | Hirono et al. |

FOREIGN PATENT DOCUMENTS

| | | |
|---|---|---|
| JP | 2009-215370 | 9/2009 |
| WO | 2009/041648 | 4/2009 |
| WO | 2009/041650 | 4/2009 |
| WO | 2009/081822 | 7/2009 |
| WO | 2009/145234 | 12/2009 |
| WO | 2009/148098 | 12/2009 |
| WO | 2010/047258 | 4/2010 |
| WO | 2010/123042 | 10/2010 |

OTHER PUBLICATIONS

U.S. Appl. No. 14/628,398, filed Feb. 23, 2015, Kaneko, et al.

\* cited by examiner

WATER/OIL REPELLENT COMPOSITION AND ARTICLE

TECHNICAL FIELD

The present invention relates to a water/oil repellent composition, and an article having its surface treated with the water/oil repellent composition.

BACKGROUND ART

As a method for imparting water/oil repellency to the surface of a substrate such as cloth, a method of treating the substrate with a water/oil repellent composition composed of an emulsion having, dispersed in an aqueous medium, a copolymer having units based on a monomer having a polyfluoroalkyl group (hereinafter a polyfluoroalkyl group will be referred to as a $R^f$ group) having at least 8 carbon atoms has been known.

However, recently, EPA (US Environmental Protection Agency) has pointed out that a compound having a perfluoroalkyl group (hereinafter a perfluoroalkyl group will be referred to as a $R^F$ group) having at least 7 carbon atoms is likely to be decomposed in the environment or in the body, and the decomposition product is likely to be accumulated, i.e. it presents a high environmental impact. Therefore, a water/oil repellent composition comprising a copolymer which has units based on a monomer having a $R^F$ group having at most 6 carbon atoms, and has no units based on a monomer having a $R^F$ group having at least 7 carbon atoms, has been required.

As a water/oil repellent composition comprising such a copolymer, for example, the following water/oil repellent compositions (1) and (2) have been proposed.

(1) A water/oil repellent composition comprising a copolymer having units based on the following monomer (a), units based on the following monomer (b) and units based on the following monomer (c), and a medium, wherein the molar ratio ((b)/(c)) of the units based on the monomer (b) to the units based on the monomer (c) is at least 1 (Patent Document 1).

Monomer (a): a monomer having a $R^F$ group having at most 6 carbon atoms.

Monomer (b): vinyl chloride.

Monomer (c): a vinyl ether having no $R^f$ group and having a crosslinkable functional group.

(2) A water/oil repellent composition comprising a copolymer having units based on the following monomer (α) and units based on the following monomer (β) and as the case requires, units based on the following monomer (γ), and having a mass average molecular weight of at least 40,000, and a medium (Patent Document 2).

Monomer (α): a monomer having a $R^F$ group having at most 6 carbon atoms.

Monomer (β): vinylidene chloride.

Monomer (γ): a monomer having no $R^f$ group and having a crosslinkable functional group.

A fiber product comprising e.g. fabric the surface of which is treated with the water/oil repellent composition (1) or (2) is considered to have favorable water repellency after it is washed and dried without forcible heating (hereinafter referred to as wash durability).

By the way, an article having its surface treated with a water/oil repellent composition (a fiber product such as a sports wear), a moisture-permeable waterproofing film may be formed on the rear side so as to impart a function to release water vapor by sweating from the body and a function to prevent penetration of rain (Patent Document 3). As a method for producing fabric having such a moisture-permeable waterproofing film, a laminate method or a coating method is well known.

The laminate method is a method of bonding a porous polyfluoroethylene film or a microporous polyurethane resin film to the rear side of fabric treated with a water/oil repellent composition by means of an adhesive component or the like. The coating method is a method of applying a coating liquid containing a polyurethane resin, an acrylic resin or the like to the rear side of fabric treated with a water/oil repellent composition. For the fabric, it is required that the bonded or applied resin film is not easily peeled.

Further, as a medium contained in the coating liquid, in the case of dry coating of forming a resin film by drying after application, a highly volatile solvent such as methyl ethyl ketone, ethyl acetate, toluene or isopropyl alcohol is used. Whereas, in the case of wet coating of forming a resin film by solidification in water, a polar organic solvent such as N,N-dimethylformamide (hereinafter referred to as DMF) is used.

PRIOR ART DOCUMENTS

Patent Documents

Patent Document 1: WO2010/047258
Patent Document 2: WO2010/123042
Patent Document 3: JP-A-07-229070

DISCLOSURE OF INVENTION

Technical Problem

However, if a coating liquid is applied to the rear side of fabric treated with the water/oil repellent composition (1) to form a moisture-permeable waterproofing film, the coating liquid penetrates to the front surface side of the fabric, and a resin film is formed even on the front surface side of the fabric, thus impairing the design of the article.

On the other hand, if a coating liquid is applied to the rear side of fabric having its surface treated with the water/oil repellent composition (2) to form a moisture-permeable waterproofing film, penetration of the coating liquid to the front surface side of the fabric is inhibited. However, the adhesion between the fabric having its surface treated with the water/oil repellent composition (2) and the moisture-permeable waterproofing film is insufficient, and the moisture-permeable waterproofing film is likely to be peeled off.

The object of the present invention is to provide a water/oil repellent composition from which an article can be obtained, which has favorable water/oil repellency and wash durability, through which penetration of a coating liquid for formation of a moisture-permeable waterproofing film can be suppressed, and from which the moisture-permeable waterproofing film is suppressed, and which the article presents a low environmental impact, and an article comprising a porous substrate such as cloth, the surface of which is treated with the water/oil repellent composition.

Solution to Problem

The water/oil repellent composition of the present invention comprises a copolymer (A) having from 60 to 95 mass % of units based on the following monomer (a1) and from 5 to 40 mass % of units based on the following monomer (a2), a copolymer (B) having from 50 to 95 mass % of units based on the following monomer (b1) and from 5 to 50 mass % of units based on the following monomer (b2), and a medium (C), wherein the proportion of the copolymer (A) is from 70 to 90 mass %, and the proportion of the copolymer (B) is from 10 to 30 mass % relative to the total amount (100 mass %) of the copolymer (A) and the copolymer (B):

monomer (a1): a compound represented by the following formula (1):

$$(Z-Y)_n X \quad (1)$$

wherein Z is a $C_{1-6}$ polyfluoroalkyl group or a group represented by the following formula (2), Y is a bivalent organic group having no fluorine atom, or a single bond, n is 1 or 2, and X is, when n is 1, any one of the groups represented by the following formulae (3-1) to (3-5) and, when n is 2, any one of the groups represented by the following formulae (4-1) to (4-4):

$$C_i F_{2i+1} O(CFX^1 CF_2 O)_j CFX^2- \quad (2)$$

wherein i is an integer of from 1 to 6, j is an integer of from 0 to 10, and each of $X^1$ and $X^2$ is a fluorine atom or a trifluoromethyl group;

$$-CR^2=CH_2 \quad (3\text{-}1)$$

$$-C(O)OCR^2=CH_2 \quad (3\text{-}2)$$

$$-OC(O)CR^2=CH_2 \quad (3\text{-}3)$$

$$-OCH_2-\phi-CR^2=CH_2 \quad (3\text{-}4)$$

$$-OCH=CH_2 \quad (3\text{-}5)$$

wherein $R^2$ is a hydrogen atom, a methyl group or a halogen atom, and $\phi$ is a phenylene group;

$$-CH[-(CH_2)_m CR^3=CH_2]- \quad (4\text{-}1)$$

$$-CH[-(CH_2)_m C(O)OCR^3=CH_2]- \quad (4\text{-}2)$$

$$-CH[-(CH_2)_m OC(O)CR^3=CH_2]- \quad (4\text{-}3)$$

$$-OC(O)CH=CHC(O)O- \quad (4\text{-}4)$$

where $R^3$ is a hydrogen atom, a methyl group or a halogen atom, and m is an integer of from 0 to 4;

monomer (a2): vinylidene chloride;

monomer (b1): a halogenated olefin; and monomer (b2): a monomer having no polyfluoroalkyl group and having a crosslinkable functional group.

It is preferred that Z is a $C_{4-6}$ perfluoroalkyl group.

It is preferred that Y is a $C_{2-4}$ alkylene group, n is 1 and X is the group represented by the formula (3-3).

Further, the copolymer (A) preferably further has units based on the following monomer (a3), and the crosslinkable functional group in the monomer (a3) is preferably a hydroxy group, a blocked isocyanate group, an amino group, an N-hydroxymethylamide group, an epoxy group or a carboxy group.

monomer (a3): a monomer having no polyfluoroalkyl group and having a crosslinkable functional group.

It is preferred that the copolymer (A) has from 65 to 89.9 mass % of the units based on the monomer (a1), from 10 to 34.9 mass % of the units based on the monomer (a2) and from 0.1 to 25 mass % of the units based on the monomer (a3).

The monomer (b1) is preferably vinyl chloride.

The copolymer (B) preferably further has units based on a monomer (b3) which is a monomer other than the monomer (b1) and the monomer (b2), and the monomer (b3) is preferably the monomer (a1) or a monomer having a $C_{1-22}$ alkyl group. The proportion of the units based on the monomer (b3) is preferably from 2 to 40 mass % relative to units (100 mass %) based on all the monomers in the copolymer (B).

The present invention further provides an article having a porous substrate, wherein the porous substrate has a water/oil repellent-treated surface treated with the water/oil repellent composition on at least one side, and has a moisture-permeable waterproofing film on one side. The porous substrate is preferably cloth.

The present invention further provides a method for producing a porous substrate having a water/oil repellent-treated surface and a moisture-permeable waterproofing film, which comprises treating at least one side of a porous substrate with the water/oil repellent composition to form the water/oil repellent-treated surface and then applying a coating liquid containing a material of the moisture-permeable waterproofing film to one side of the porous substrate to form the moisture-permeable waterproofing film.

Advantageous Effects of Invention

According to the water/oil repellent composition of the present invention, it is possible to obtain a porous substrate such as fabric, which has favorable water/oil repellency and wash durability, through which penetration of a coating liquid for formation of a moisture-permeable waterproofing film is suppressed, and from which peeling of the moisture-permeable waterproofing film is suppressed. Further, the water/oil repellent composition of the present invention presents a low environmental impact.

The article having the above treated porous substrate of the present invention has favorable water/oil repellency and wash durability, the article is excellent in the design since penetration of a coating liquid for formation of a moisture-permeable waterproofing film is suppressed, the moisture-permeable waterproofing film is hardly peeled from the article, and the article presents a low environmental impact.

DESCRIPTION OF EMBODIMENTS

In this specification, a compound represented by the formula (1) will be referred to as a compound (1). Compounds represented by other formulae will also be referred to in the same manner.

Further, in this specification, a group represented by the formula (2) will be referred to as a group (2). Groups represented by other formulae will also be referred to in the same manner.

A (meth)acrylate in this specification means an acrylate or a methacrylate.

In this specification, a monomer means a compound having a polymerizable unsaturated group.

In this specification, a $R^f$ group is a group having some or all of hydrogen atoms in an alkyl group substituted by fluorine atoms, and a $R^F$ group is a group having all the hydrogen atoms in an alkyl group substituted by fluorine atoms.

In this specification, among substrates to be water/oil repellent-treated with the water/oil repellent composition, a substrate which is porous will be referred to as a porous substrate. A representative example of the porous substrate is a sheet-form porous substrate such as cloth.

In this specification, a moiety derived from a monomer constituting a polymer will be referred to as "units based on a monomer" or "monomer units". Units based on a monomer may sometimes be represented by the name of the monomer and "units".

The proportion of monomer units in a copolymer in the present invention is obtained from NMR analysis and elemental analysis. In a case where it cannot be determined from the NMR analysis and the elemental analysis, it may be calculated based on the amount of monomers charged at the time of preparation of the copolymer.

The mass average molecular weight (Mw) and the number average molecular weight (Mn) of a copolymer are molecular weights as calculated as polystyrene, measured by gel permeation chromatography (GPC), and specifically, measured by the following method.

A copolymer is dissolved in a solvent mixture of a fluorinated solvent (AK-225 manufactured by Asahi Glass Company, Limited)/tetrahydrofuran (THF)=6/4 (volume ratio) to prepare a 0.5 mass % solution, which is passed through a 0.2 μm filter to prepare a sample for analysis. With respect to the sample, the number average molecular weight (Mn) and the mass average molecular weight (Mw) are measured under the following conditions.

Measurement temperature: 37° C.,
injected amount: 50 μL,
outflow rate: 1 mL/min,
eluent: a solvent mixture of a fluorinated solvent (AK-225 manufactured by Asahi Glass Company, Limited)/THF=6/4 (volume ratio).

<Water/Oil Repellent Composition>

The water/oil repellent composition of the present invention comprises a specific copolymer (A), a specific copolymer (B) and a medium (C) as essential components, and as the case requires, contains a surfactant (D) and additives (E).

(Copolymer (A))

The copolymer (A) has units based on the monomer (a1) and units based on the monomer (a2).

The copolymer (A) preferably further has units based on the monomer (a3) and as the case requires, may have units based on the after-mentioned monomer (a4).

Monomer (a1):

The monomer (a) is a compound (1):

$$(Z-Y)_n X \quad (1)$$

wherein Z is a $C_{1-6}$ $R^f$ group (provided that the $R^f$ group may contain an etheric oxygen atom) or a group (2):

$$C_i F_{2i+1} O(CFX^1 CF_2 O)_j CFX^2- \quad (2)$$

wherein i is an integer of from 1 to 6, j is an integer of from 0 to 10, each of $X^1$ and $X^2$ which are independent of each other, is a fluorine atom or a trifluoromethyl group.

The $R^f$ group is preferably a $R^F$ group. The $R^f$ group may be linear or may be branched, and is preferably linear. The $R^f$ group is particularly preferably a $C_{4-6}$ linear $R^F$ group.

Z may be the following groups.

$F(CF_2)_4-$, $F(CF_2)_5-$, $F(CF_2)_6-$, $(CF_3)_2 CF(CF_2)_2-$, $C_k F_{2k+1} O[CF(CF_3)CF_2 O]_h -CF(CF_3)-$, etc., wherein k is an integer of from 1 to 6, and h is an integer of from 0 to 10.

Y is a bivalent organic group having no fluorine atom, or a single bond.

The bivalent organic group is preferably an alkylene group. The alkylene group may be linear or branched, and preferably has 1 to 6 carbon atoms. The bivalent organic group may be an organic group having —O—, —NH—, —CO—, —S—, —SO₂—, —CD¹=CD²- (wherein each of D¹ and D² which are independent of each other, is a hydrogen atom or a methyl group), etc. Particularly preferred as Y is a $C_{2-4}$ linear alkylene group.

Y may, for example, be the following groups.

—CH₂—, —CH₂CH₂—, —(CH₂)₃—, —CH₂CH₂CH(CH₃)—, —CH=CH—CH₂—, —S—CH₂CH₂—, —CH₂CH₂—S—CH₂CH₂—, —CH₂CH₂—SO₂—CH₂CH₂—, —W—OC(O)NH—V—NHC(O)O—($C_p H_{2p}$)—, etc., wherein p is an integer of from 2 to 30.

V is a symmetric alkylene group having no branch, an arylene group or an aralkylene group and is preferably —C₆H₁₂—, -φ-CH₂-φ- or -φ- (wherein φ is a phenylene group).

W is any one of the following groups.

—SO₂N(R¹)—$C_d H_{2d}$—, —CONHC$_d$H$_{2d}$—, —$C_q H_{2q}$— wherein R¹ is a hydrogen atom or a $C_{1-4}$ alkyl group, d is an integer of from 2 to 8, and q is an integer of from 1 to 20.

n is 1 or 2. n is preferably 1.

X is, when n is 1, any one of groups (3-1) to (3-5) and when n is 2, any one of groups (4-1) to (4-4):

$$-CR^2=CH_2 \quad (3-1)$$

$$-C(O)OCR^2=CH_2 \quad (3-2)$$

$$-OC(O)CR^2=CH_2 \quad (3-3)$$

$$-OCH_2-\phi-CR^2=CH_2 \quad (3-4)$$

$$-OCH=CH_2 \quad (3-5)$$

wherein $R^2$ is a hydrogen atom, a methyl group or a halogen atom, and φ is a phenylene group.

When n is 1, X is preferably the group (3-3).

$$-CH[-(CH_2)_m CR^3=CH_2]- \quad (4-1)$$

$$-CH[-(CH_2)_m C(O)OCR^3=CH_2]- \quad (4-2)$$

$$-CH[-(CH_2)_m OC(O)CR^3=CH_2]- \quad (4-3)$$

$$-OC(O)CH=CHC(O)O- \quad (4-4)$$

wherein $R^3$ is a hydrogen atom, a methyl group or a halogen atom, and m is an integer of from 0 to 4.

When n is 2, X is preferably the group (4-3).

The compound (1) is preferably a (meth)acrylate having a $C_{4-6}$ $R^F$ group from the viewpoint of e.g. the polymerizability with other monomers, the flexibility of the coating film containing the copolymer (A), the adhesion of the copolymer (A) to the substrate, the dispersibility in the medium (C) and efficiency of the emulsion polymerization.

The compound (1) is preferably a compound wherein Z is a $C_{4-6}$ $R^F$ group, Y is a $C_{1-4}$ alkylene group, n is 1, and X is the group (3-3).

Monomer (a2):

The monomer (a2) is vinylidene chloride.

By having the monomer (a2) units, the affinity of the copolymer (A) to the substrate and the film-forming property are improved. Therefore, even when a substrate dipped in the water/oil repellent composition is air-dried, the copolymer (A) will infiltrate even into a portion where a coating film of the copolymer (A) is hardly formed, such as a portion between fibers in fabric, in every hole and corner, and a uniform and ideal coating film of the copolymer (A) can be formed. As a result, sufficient wash durability can be imparted to an article.

Monomer (a3):

The monomer (a3) is a monomer having no $R^f$ group and having a crosslinkable functional group.

By having the monomer (a3) units, peeling of the moisture-permeable waterproofing film can be suppressed, and further, wash durability of the article will further be improved.

The crosslinkable functional group is preferably a functional group having at least one bond selected from a covalent bond, an ionic bond and a hydrogen bond, or a functional group capable of forming a crosslinked structure by an interaction of such a bond. Otherwise, the crosslinkable functional group may be a functional group having an active organic group or an element such as hydrogen or halogen in its molecule.

Such a functional group is preferably a hydroxy group, an isocyanate group, a blocked isocyanate group, an alkoxysilyl group, an amino group, a N-hydroxymethylamide group, a N-alkoxymethylamide group, a silanol group, an ammonium group, an amide group, an epoxy group, an oxazoline group, a carboxy group, an alkenyl group, a sulfonic group or the like, particularly preferably a hydroxy group, a blocked isocyanate group, an amino group, a N-hydroxymethylamide group, an epoxy group or a carboxy group, which is reactive with an isocyanate group of a urethane resin constituting the moisture-permeable waterproofing film or an amino group or an isocyanate group of the after-mentioned thermosetting agent directly or by means of another compound (such as water).

The monomer (a3) is preferably a (meth)acrylate, an acrylamide, a vinyl ether or a vinyl ester.

The monomer (a3) may, for example, be the following compounds.

(Meth)acrylates: glycidyl(meth)acrylate, 2-hydroxyethyl (meth)acrylate, 2-hydroxypropyl(meth)acrylate, 4-hydroxybutyl(meth)acrylate, 3-chloro-2-hydroxypropyl (meth)acrylate, dimethylaminoethyl(meth)acrylate, diethylaminoethyl (meth)acrylate, dimethylaminopropyl(meth)acrylate, a polycaprolactone ester of hydroxyethyl (meth)acrylate (tradename: "PLACCEL", FA, FM series manufactured by Daicel Chemical Industries, Ltd., 2-isocyanatoethyl(meth) acrylate, 3-isocyanatopropyl (meth)acrylate, 4-isocyanatobutyl(meth)acrylate, a 2-butanoneoxime adduct of 2-isocyanatoethyl(meth)acrylate, a pyrazole adduct of 2-isocyanatoethyl(meth)acrylate, a 3,5-dimethylpyrazole adduct of 2-isocyanatoethyl(meth)acrylate, a 3-methylpyrazole adduct of 2-isocyanatoethyl(meth)acrylate, an ε-caprolactam adduct of 2-isocyanatoethyl(meth)acrylate, a 2-butanoneoxime adduct of 3-isocyanatopropyl (meth)acrylate, a pyrazole adduct of 3-isocyanatopropyl(meth)acrylate, a 3,5-dimethylpyrazole adduct of 3-isocyanatopropyl(meth)acrylate, a 3-methylpyrazole adduct of 3-isocyanatopropyl(meth) acrylate, an ε-caprolactam adduct of 3-isocyanatopropyl (meth)acrylate, a 2-butanoneoxime adduct of 4-isocyanatobutyl (meth)acrylate, a pyrazole adduct of 4-isocyanatobutyl(meth)acrylate, a 3,5-dimethylpyrazole adduct of 4-isocyanatobutyl(meth)acrylate, a 3-methylpyrazole adduct of 4-isocyanatobutyl(meth)acrylate, an ε-caprolactam adduct of 4-isocyanatobutyl(meth)acrylate.

Acrylamides: (meth)acrylamide, N-methyl(meth)acrylamide, N-methylol (meth)acrylamide, N-butoxymethyl(meth) acrylamide, methoxymethyl (meth)acrylamide, ethoxymethyl(meth)acrylamide, butoxymethyl(meth)acrylamide, diacetone(meth)acrylamide.

3-Methacryloyloxypropyltrimethoxysilane, trimethoxyvinylsilane, vinyltrimethoxysilane.

(Meth)acryloyloxyethyltrimethylammonium chloride, (meth)acryloyloxypropyltrimethylammonium chloride, (meth)acrylamideethyltrimethylammonium chloride, (meth) acrylamidepropyltrimethylammonium chloride.

Vinyl ethers: 2-chloroethyl vinyl ether, 2-hydroxyethyl vinyl ether, 3-hydroxypropyl vinyl ether, 2-hydroxypropyl vinyl ether, 2-hydroxyisopropyl vinyl ether, 4-hydroxybutyl vinyl ether, 4-hydroxycyclohexyl vinyl ether, hexamethylene glycol monovinyl ether, 1,4-cyclohexanedimethanol monovinyl ether, diethylene glycol monovinyl ether, triethylene glycol monovinyl ether, dipropylene glycol monovinyl ether, glycidyl vinyl ether, 2-aminoethyl vinyl ether, 3-aminopropyl vinyl ether, 2-aminobutyl vinyl ether, allyl vinyl ether.

The monomer (a3) is preferably a (meth)acrylate or an acrylamide, and is specifically preferably a 3,5-dimethylpyrazole adduct of 2-isocyanatoethyl (meth)acrylate, a 2-butanoneoxime adduct of 2-isocyanatoethyl(meth)acrylate, 2-hydroxyethyl(meth)acrylate, N-methylol(meth)acrylamide, glycidyl(meth)acrylate, 3-chloro-2-hydroxypropyl methacrylate, a polycaprolactone ester of hydroxyethyl (meth)acrylate (tradename: "PLACCEL" FA, FM-series manufactured by Daicel Chemical Industries, Ltd.).

Monomer (a4):

The monomer (a4) is another monomer excluding the monomer (a1), the monomer (a2) and the monomer (a3).

The monomer (a4) is preferably a (meth)acrylate or an unsaturated carboxylic acid ester. The (meth)acrylate is preferably an alkyl(meth)acrylate having a $C_{1-2}$ alkyl group, or a monocyclic or polycyclic cycloalkyl(meth)acrylate having a $C_{5-16}$ cycloalkyl group. The unsaturated carboxylic acid ester is preferably an unsaturated monocarboxylic acid monoalkyl ester having a $C_{1-12}$ alkyl group or an unsaturated dicarboxylic acid dialkyl ester. Including other compounds, the monomer (a4) may, for example, be the following compounds.

(Meth)acrylates: methyl(meth)acrylate, ethyl(meth)acrylate, propyl (meth)acrylate, n-butyl(meth)acrylate, t-butyl (meth)acrylate, i-butyl(meth)acrylate, cyclohexyl(meth) acrylate, 2-ethylhexyl(meth)acrylate, n-hexyl(meth)acrylate, benzyl (meth)acrylate, octyl(meth)acrylate, lauryl(meth) acrylate, cetyl(meth)acrylate, stearyl (meth)acrylate, behenyl (meth)acrylate, isobornyl(meth)acrylate, dicyclopentanyl (meth)acrylate, dicyclopentenyl(meth)acrylate, a (meth) acrylate having a repeating structure of siloxane bonds in its side chains, a (meth)acrylate having a urethane bond.

Unsaturated carboxylic acid esters: crotonic acid alkyl esters, maleic acid alkyl esters such as diethyl maleate, dipropyl maleate and dioctyl maleate, fumaric acid alkyl esters such as diethyl fumarate and dipropyl fumarate, citraconic acid alkyl esters, mesaconic acid alkyl esters, allyl acetate.

Others: N-vinylcarbazole, maleimide, N-methylmaleimide, vinylpyrrolidone, vinyl chloride.

The combination of the monomer units is preferably, in view of the water/oil repellency and the wash durability, a combination of monomer (a1): (meth)acrylate units having a $C_{4-6}$ $R^F$ group, monomer (a2): vinylidene chloride units and monomer (a3): units of the monomer of the above-described preferred embodiment.

The proportion of the monomer (a1) units is, in view of the water/oil repellency and the wash durability, from 60 to 95 mass %, preferably from 65 to 89.9 mass %, particularly preferably from 70 to 84.5 mass % relative to all the monomer units (100 mass %) in the copolymer (A).

The proportion of the monomer (a2) units is, in view of the water/oil repellency and the wash durability, from 5 to 40 mass %, preferably from 10 to 34.9 mass %, particularly preferably from 15 to 29.5 mass % relative to all the monomer units (100 mass %) in the copolymer (A).

The proportion of the monomer (a3) units is preferably from 10 to 35 mass %, and in view of the adhesion to the moisture-permeable waterproofing film and the wash durability, more preferably from 0.1 to 25 mass %, particularly preferably from 0.5 to 15 mass % relative to all the monomer units (100 mass %) in the copolymer (A).

The proportion of the monomer (a4) units is preferably from 0 to 35 mass %, more preferably from 0 to 30 mass %, particularly preferably from 0 to 15 mass % relative to all the monomer units (100 mass %) in the copolymer (A).

The mass average molecular weight (Mw) of the copolymer (A) is preferably at least 70,000, more preferably at least 75,000, particularly preferably at least 80,000. Within such a range, penetration of a coating liquid for formation of a moisture-permeable waterproofing film or the like when applied to the rear side of a porous substrate, to the front surface side, can be suppressed. The mass average molecular weight (Mw) of the copolymer (A) is preferably at most 200,000, particularly preferably at most 170,000 in view of the film-forming property and the storage stability.

The number average molecular weight (Mn) of the copolymer (A) is preferably at least 32,000, particularly preferably at least 35,000. The number average molecular weight (Mn) of the copolymer (A) is preferably at most 100,000, particularly preferably at most 80,000.

(Copolymer (B))

The copolymer (B) has units based on the monomer (b1) and units based on the monomer (b2).

The copolymer (B) may have units based on the monomer (b3) as the case requires.

Monomer (b1):

The monomer (b1) is a halogenated olefin.

By having the monomer (b1) units, the strength of the coating film will be improved, and the adhesion to the substrate or the moisture-permeable waterproofing film will be improved.

The halogenated olefin is preferably chlorinated olefin or fluorinated olefin, and may, for example, be specifically vinyl chloride, vinylidene chloride, tetrafluoroethylene or vinylidene fluoride. In view of the adhesion to the substrate or the moisture-permeable waterproofing film, more preferred is vinyl chloride or vinylidene chloride, and particularly preferred is vinyl chloride.

Monomer (b2):

The monomer (b2) is a monomer having no $R^f$ group and having a crosslinkable functional group.

By having the monomer (b2) units, peeling of the moisture-permeable waterproofing film will be suppressed. Further, the wash durability of an article will further be improved.

The crosslinkable functional group may be the functional groups exemplified for the monomer (a3), and the preferred embodiment is also the same.

The monomer (b2) may be the compound exemplified for the monomer (a3), and the preferred embodiment is also the same.

Monomer (b3):

The monomer (b3) is another monomer excluding the monomer (b1) and the monomer (b2).

The monomer (b3) may be the compound exemplified for the above monomer (a1) or the above monomer (a4).

The monomer (b3) is preferably the monomer (a1) or the monomer (a4).

The copolymer (B) is, from the viewpoint of the compatibility with the copolymer (A), preferably a copolymer (B) having units based on the monomer (b3), at least part of the monomer (b3) being the above monomer (a1).

The combination of the monomer units is, with a view to suppressing peeling of the moisture-permeable waterproofing film, preferably a combination of vinyl chloride units or vinylidene chloride units as the monomer (b1) units, units of the monomer (b2) and units of the monomer (b3) of the above preferred embodiments.

The proportion of the monomer (b1) units is, with a view to suppressing peeling of the moisture-permeable waterproofing film, from 50 to 95 mass %, more preferably from 55 to 95 mass %, particularly preferably from 55 to 90 mass % relative to all the monomer units (100 mass %) in the copolymer (B).

The proportion of the monomer (b2) units is, with a view to suppressing peeling of the moisture-permeable waterproofing film, from 5 to 50 mass %, more preferably from 5 to 45 mass %, particularly preferably from 5 to 25 mass % relative to all the monomer units (100 mass %) in the copolymer (B).

The proportion of the monomer (b3) units is from 0 to 45 mass %, more preferably from 2 to 40 mass %, particularly preferably from 5 to 35 mass % relative to all the monomer units (100 mass %) in the copolymer (B).

The mass average molecular weight (Mw) of the copolymer (B) is preferably at least 10,000, more preferably at least 20,000, particularly preferably at least 30,000. Within the above range, the obtainable article will be excellent in the water/oil repellency and the wash durability. The mass average molecular weight (Mw) of the copolymer (B) is, in view of the film-forming property and the storage stability, preferably at most 1,000,000, particularly preferably at most 500,000.

The number average molecular weight (Mn) of the copolymer (B) is preferably at least 5,000, particularly preferably at least 10,000. The number average molecular weight (Mn) of the copolymer (B) is preferably at most 300,000, particularly preferably at most 150,000.

(Method for Producing Copolymer)

The copolymer (A) and the copolymer (B) are produced, for example, by a method of polymerizing the monomer components including the above respective monomers in a medium in the presence of a polymerization initiator to obtain a solution, dispersion or emulsion of each copolymer.

The polymerization method may, for example, be a solution polymerization method, a dispersion polymerization method, an emulsion polymerization method or a suspension polymerization method, and emulsion polymerization is preferred. Further, the polymerization method may be polymerization all at once or multistage polymerization.

The method for producing the copolymer (A) and the copolymer (B) is preferably a method of polymerizing the monomer components including the above respective monomers by emulsion polymerization in an aqueous medium in the presence of a surfactant and a polymerization initiator to obtain an emulsion of each copolymer.

With a view to improving the yield of the copolymer, it is preferred to pre-emulsify a mixture comprising the monomers, the surfactant and the aqueous medium, prior to the emulsion polymerization. For example a mixture comprising the monomers, the surfactant and the aqueous medium is mixed and dispersed by an ultrasonic stirring apparatus, a homomixer or a high pressure emulsifier.

Polymerization Initiator:

The polymerization initiator may, for example, be a thermal polymerization initiator, a photopolymerization initiator, a radiation polymerization initiator, a radical polymerization initiator or an ionic polymerization initiator, and a water-soluble or oil-soluble radical polymerization initiator is preferred.

As the radical polymerization initiator, a common initiator such as an azo type polymerization initiator, a peroxide type polymerization initiator or a redox type initiator is employed depending upon the polymerization temperature. As the radical polymerization initiator, an azo type compound is particularly preferred, and in a case where polymerization is carried out in an aqueous medium, a salt of an azo type compound is more preferred. The polymerization temperature is preferably from 20 to 150° C.

The amount of the polymerization initiator is preferably from 0.1 to 5 parts by mass, more preferably from 0.1 to 3 parts by mass, per 100 parts by mass of the monomer components.

Molecular Weight-controlling Agent:

At the time of polymerization of the monomer components, a molecular weight-controlling agent may be employed. The molecular weight-controlling agent is preferably an aromatic compound, a mercapto alcohol or a mercaptan, particularly preferably an alkylmercaptan.

The amount of addition of the molecular weight-controlling agent is properly adjusted so that Mw and Mn of the obtainable copolymer will be within the above ranges Medium:

As the medium, the after-mentioned medium (C) may be mentioned, and an aqueous medium is preferred.

The aqueous medium may be the same aqueous medium as mentioned hereinafter, and the preferred embodiment is also the same.

Surfactants:

The surfactant may be the after-mentioned surfactant (D), and the preferred embodiment is also the same.

The proportion of the monomers in the monomer components is the same as the proportion of the monomer units in the copolymer since substantially 100% of the monomers are polymerized, and the preferred embodiment is also the same.

The solid content concentration of the emulsion is preferably from 20 to 40 mass % in the emulsion (100 mass %) immediately after production of the copolymer. Further, the solid content concentration is a concentration containing the surfactant in addition to the copolymer. The content of the copolymer in the emulsion is preferably from 18 to 40 mass % immediately after production of the copolymer.

The solid content concentration of the emulsion is calculated from the mass of the emulsion before heating and the mass after drying for 4 hours by a counter current canal dryer at 120° C.

(Medium (C))

The medium (C) may, for example, be water, an alcohol (such as an alkanoyl, an alkylene glycol or a polyalkylene glycol), a monoalkyl ether of a polyhydric alcohol, a halogen compound, a hydrocarbon, a ketone, an ester, an ether, a nitrogen compound, a sulfur compound, an inorganic solvent or an organic acid.

The alcohol is preferably an alkanoyl having at most 6 carbon atoms, a dihydric alcohol (such as an alkylene glycol) having at most 4 carbon atoms, or a multimer of a dihydric alcohol having at most 4 carbon atoms (such as dialkylene glycol or trialkylene glycol). The monoalkyl ether of a polyhydric alcohol is preferably a monoalkyl ether of an alkylene glycol having at most 4 carbon atoms or its multimer polyalkylene glycol, in which the alkyl group has from 1 to 4 carbon atoms.

The medium (C) is preferably an aqueous medium in view of the solubility and the handling efficiency.

The aqueous medium may be water or water containing a water-soluble organic solvent.

The water-soluble organic solvent may, for example, be tert-butanol, 3-methoxymethylbutanol, propylene glycol, dipropylene glycol, dipropylene glycol monomethyl ether or tripropylene glycol, and is preferably dipropylene glycol, tripropylene glycol or dipropylene glycol monomethyl ether.

In a case where the aqueous medium contains the water-soluble organic solvent, the content of the water-soluble organic solvent is preferably from 1 to 80 parts by mass, more preferably from 10 to 60 parts by mass per 100 parts by mass of water.

(Surfactant (D))

The surfactant (D) may, for example, be a hydrocarbon type surfactant or a fluorinated surfactant, and each of which may, for example, be an anionic surfactant, a nonionic surfactant, a cationic surfactant, or an amphoteric surfactant. As the surfactant (D), from the viewpoint of the compatibility with additives, it is preferred to use a nonionic surfactant and an amphoteric surfactant in combination, and from the viewpoint of the adhesion, it is preferred to use a nonionic surfactant alone or to use a nonionic surfactant and a cationic surfactant in combination. The ratio of the nonionic surfactant to the cationic surfactant (nonionic surfactant/cationic surfactant) is preferably from 97/3 to 40/60 (mass ratio).

The nonionic surfactant is preferably at least one member selected from the group consisting of surfactants $s^1$ to $s^6$ as disclosed in Patent Documents 1 and 2.

In a case where the surfactant (D) contains a cationic surfactant, such a cationic surfactant is preferably surfactant $s^7$ as disclosed in Patent Documents 1 and 2.

In a case where the surfactant (D) contains an amphoteric surfactant, such an amphoteric surfactant is preferably surfactant $s^8$ as disclosed in Patent Documents 1 and 2.

Further, as the surfactant (D), surfactant $S^9$ (polymer surfactant) as disclosed in Patent Documents 1 and 2 may also be used.

The preferred embodiment of the surfactant (D) is the same as the preferred embodiment disclosed in Patent Documents 1 and 2.

(Additives (E))

The additives include, for example, a penetrant, a defoamer, a water-absorbing agent, an antistatic agent, an antistatic polymer, an anticrease agent, a texture-adjusting agent, a film-forming assistant, a water-soluble polymer (such as polyacrylamide or polyvinyl alcohol), a thermosetting agent (such as a melamine resin, a urethane resin, a triazine ring-containing compound or an isocyanate-type compound), an epoxy curing agent (such as isophthalic acid dihydrazide, adipic acid dihydrazide, sebacic acid dihydrazide, dodecanedioic acid dihydrazide, 1,6-hexamethylenebis(N,N-dimethylsemicarbazide), 1,1,1',1'-tetramethyl-4,4'-(methylene-di-p-phenylene)disemicarbazide or spiroglycol), a thermosetting catalyst, a crosslinking catalyst (such as an organic acid or ammonium chloride), a synthetic resin, a fiber-stabilizer and inorganic fine particles.

Further, the water/oil repellent composition of the present invention may contain a copolymer capable of exhibiting water repellency and/or oil repellency (e.g. a commercially available water repellent, a commercially available oil repellent, a commercially available water/oil repellent or a commercially available SR (soil release) agent) other than the copolymer (A) and the copolymer (B), a water-repellent compound having no fluorine atom, or the like as the case requires. The water-repellent compound having no fluorine atom may, for example, be a paraffin type compound, an aliphatic amide type compound, an alkylethylene urea compound or a silicone compound.

(Proportion of Components in Water/Oil Repellent Composition)

The proportion of the copolymer (A) is from 70 to 90 mass %, preferably from 75 to 90 mass %, particularly preferably from 81 to 90 mass % relative to the total amount (100 mass %) of the copolymer (A) and the copolymer (B). When the proportion of the copolymer (A) is at least 70 mass %, the water/oil repellency and the wash durability are favorable, and penetration of the coating liquid for formation of the moisture-permeable waterproofing film can be suppressed.

When the proportion of the copolymer (A) is at most 90 mass %, peeling of the moisture-permeable waterproofing film can be suppressed.

The proportion of the copolymer (B) is from 10 to 30 mass %, preferably from 10 to 25 mass %, particularly preferably from 10 to 19 mass % relative to the total amount (100 mass %) of the copolymer (A) and the copolymer (B). When the proportion of the copolymer (B) is at least 10 mass %, peeling of the moisture-permeable waterproofing film can be suppressed. When the proportion of the copolymer (B) is at most 30 mass %, the water/oil repellency and the wash durability will be favorable, and penetration of the coating liquid for formation of the moisture-permeable waterproofing film can be suppressed.

The amount of the surfactant (D) is preferably from 1 to 10 parts by mass, more preferably from 1 to 9 parts by mass, particularly preferably from 1 to 7 parts by mass relative to the total amount (100 parts by mass) of the copolymer (A) and the copolymer (B).

The solid content concentration of the water/oil repellent composition of the present invention is preferably from 0.2 to 5 mass % in the water/oil repellent composition (100 mass %) at the time of treating the substrate.

The solid content concentration of the water/oil repellent composition is calculated from the mass of the water/oil repellent composition before heating and the mass after drying for 4 hours by a counter current canal dryer at 120° C.

(Average Particle Size)

In the water/oil repellent composition of the present invention, it is preferred that the copolymer is dispersed in the form of particles in the aqueous medium.

The average particle size of the copolymer is preferably from 10 to 1,000 nm, more preferably from 10 to 300 nm, particularly preferably from 10 to 250 nm. When the average particle size is within such a range, it will be unnecessary to use a surfactant, etc. in a large amount, the water repellency will be good, and when dyed cloths are treated, no color fading will result, and the dispersed particles can stably be present in the aqueous medium without precipitation. The average particle size of the copolymer can be measured by e.g. a dynamic light-scattering apparatus or an electron microscope.

(Functional Effect)

The above-described water/oil repellent composition of the present invention comprises a copolymer (A) having from 60 to 95 mass % of the monomer (a1) units and from 5 to 40 mass % of the monomer (a2) units in a specific proportion, and accordingly by using such a composition, it is possible to obtain a porous substrate which has favorable water/oil repellency and wash durability, and through which penetration of the coating liquid for formation of a moisture-permeable waterproofing film is suppressed.

Further, the water/oil repellent composition of the present invention comprises a copolymer (B) having from 50 to 95 mass % of the monomer (b1) units and from 5 to 50 mass % of the monomer (b2) units in a specific proportion, and accordingly by using such a composition, it is possible to obtain an article from which peeling of the moisture-permeable waterproofing film is suppressed.

Further, in the water/oil repellent composition of the present invention, the copolymer (A) nor the copolymer (B) has units of a monomer having an $R^F$ group having at least 7 carbon atoms, whereby the content (content in a case where the solid content concentration is 20 mass %) of perfluorooctanoic acid (PFOA) and perfluorooctanesulfonic acid (PFOS), and their precursors and analogues of which the effects on the environment are pointed out, can be reduced to a level of not higher than the detection limit as an analytical value of LC-MS/MS by the method disclosed in WO2009/081822.

(Application)

The water/oil repellent composition of the present invention may be used for treating the surface of a substrate. Further, it is also useful to applications to impart water/oil repellency by mixing with polypropylene, nylon or the like, followed by forming and formation into fibers.

The substrate to be treated may, for example, be fibers (natural fibers, synthetic fibers, mixed fibers, etc.), cloths (woven fabric, textile fabric, nonwoven fabric, etc.), various fiber products (clothing (sports wears, coats, jumpers, work clothes, uniforms, etc.), bags, industrial materials, etc.), resin products, paper, leathers, metal products, stone products, concrete products, gypsum products and glass products.

The substrate is preferably a porous substrate. The porous substrates includes cloths (woven fabric, textile fabric, nonwoven fabric, etc.), porous fiber products such as clothing, a porous resin sheet, pumice and wood. Particularly, cloths are preferred.

The treatment method may, for example, be a method of coating the substrate with a coating liquid containing the water/oil repellent composition by a known coating method, followed by drying, or a method of dipping the substrate in a coating liquid containing the water/oil repellent composition, followed by drying.

Further, after treatment with the water/oil repellent composition of the present invention, antistatic finish, softening finish, antibacterial finish, deodorant finish or waterproofing finish may, for example, be carried out.

<Article>

The present invention provides an article which has a porous substrate having a water/oil repellent-treated surface treated with the water/oil repellent composition on one side, and a moisture-permeable waterproofing film on one side. It may, for example, be cloth having a water/oil repellent-treated surface on one side and having a moisture-permeable waterproofing film on the other side not water/oil repellent-treated, or a clothing obtained by using such cloth. Further, it may also be cloth having water/oil repellent-treated surfaces on both sides and having a moisture-permeable waterproofing film on one water/oil repellent-treated surface, or a clothing obtained by using such cloth.

The moisture-permeable waterproofing film may, for example, be a porous polyurethane resin film.

The present invention further provides a method for producing a porous substrate having a water/oil repellent-treated surface and a moisture-permeable waterproofing film, which comprises treating at least one side of a porous substrate with the water/oil repellent composition to form the water/oil repellent-treated surface, and applying a coating liquid containing a material of the moisture-permeable waterproofing film to one side of the porous substrate to form the moisture-permeable waterproofing film.

Specifically, for example, a porous substrate having a water/oil repellent-treated surface and a moisture-permeable waterproofing film is produced by a method of subjecting one side of the porous substrate to water/oil repellent treatment and then forming the moisture-permeable waterproofing film to a side not water/oil repellent-treated, or a method of subjecting both sides of the porous substrate to water/oil repellent treatment, and forming the moisture-permeable waterproofing film to one of the water/oil repellent-treated surfaces.

The porous substrate is preferably cloth, and the moisture-permeable waterproofing film is preferably a microporous polyurethane resin film.

The coating liquid contains a material of the moisture-permeable waterproofing film, the solvent and the like.

The material of the moisture-permeable waterproofing film may be a known polyurethane resin obtainable by reacting a polyisocyanate component and a polyol component. As the polyisocyanate component, an aromatic diisocyanate, an aliphatic diisocyanate, an alicyclic diisocyanate and the like may be used alone or as mixed. Specifically, tolylene-2,4-diisocyanate, 4,4'-diphenylmethanediisocyanate, 1,6-hexanediisocyanate, 1,4-cyclohexanediisocyanate or the like may be used as the main component, and as the case requires, a tri-functional or higher polyisocyanate may be used. As the polyol component, a polyether polyol, a polyester polyol or the like may be used. As the polyether polyol, polyethylene glycol, polypropylene glycol, polytetraethylene glycol or the like may be used. As the polyester polyol, a reaction product of a diol such as ethylene glycol or propylene glycol and a dibasic acid such as adipic acid or sebacic acid, or a ring-opening polymer of e.g. caprolactone may be used, and needless to say, a polymer of an oxyacid monomer or a prepolymer thereof may be used.

As the solvent, a polar organic solvent is preferably used, and N,N-dimethylformamide (DMF), N,N-dimethylacetamide, dimethylsulfoxide, N-methylpyrrolidone or hexamethylenephosphonamide may, for example, be mentioned. An assistant such as a fluorinated water repellent or crosslinking agent may be added to the polyurethane resin solution.

The moisture-permeable waterproofing film may be formed, for example, by applying the coating liquid to one surface of the porous substrate, leaving the porous substrate at rest for a certain time, and then dipping the substrate in water for a predetermined time to remove the solvent, followed by drying. As the coating method, various coating methods such as knife coating, knife over roll coating and reverse roll coating may be employed.

By the above-described method for producing the porous substrate of the present invention, it is possible to obtain a porous substrate having a water/oil repellent-treated surface and a moisture-permeable waterproofing film, which has favorable water/oil repellency and wash durability, which is excellent in the design since penetration of the coating liquid for formation of the moisture-permeable waterproofing film or the like is suppressed, from which the moisture-permeable waterproofing film is hardly peeled, and which presents a low environmental impact.

EXAMPLES

Now, the present invention will be described in detail with reference to Examples. However, it should be understood that the present invention is by no means restricted thereto.

Ex. 1 to 13 are Preparation Examples, Ex. 15, 22 to 26, 28 to 30 and 32 to 37 are Examples of the present invention, and Ex. 14, 16 to 21, 27 and 31 are Comparative Examples.

<Physical Properties of Copolymer>

With respect to a copolymer recovered by the following recovering method, the molecular weight was measured.

(Recovering Method)

6 g of an emulsion was dropped to 60 g of 2-propanol (hereinafter referred to as IPA), followed by stirring to precipitate a solid. The mixture was subjected to centrifugal separation at 3,000 rpm for 5 minutes, and the obtained solid was separated. 12 g of IPA was added again, followed by stirring. The mixture was subjected to centrifugal separation at 3,000 rpm for 5 minutes, and the obtained solid was separated from the supernatant liquid and vacuum dried at 35° C. overnight to obtain a copolymer.

(Molecular Weight)

The recovered copolymer was dissolved in a solvent mixture of a fluorinated solvent (AK-225 manufactured by Asahi Glass Company, Limited)/THF=6/4 (volume ratio) to form a 0.5 mass % solution, which was passed through a 0.2 µm filter to prepare a sample for analysis. With respect to the sample, the number average molecular weight (Mn) and the mass average molecular weight (Mw) were measured. The measuring conditions are as follows.

Apparatus: HLC-8220 GPC manufactured by Tosoh Corporation,

Column: MIXED-C and 100A manufactured by Polymer Laboratories connected in series, Measurement temperature: 37° C., injected amount: 50 µL, outflow rate: 1 µL/min, standard sample: EasiCal PS-2 manufactured by Polymer Laboratories, eluent: a solvent mixture of a fluorinated solvent (AK-225 manufactured by Asahi Glass Company, Limited)/THF=6/4 (volume ratio).

<Evaluation of Treated Cloth>

(Water Repellency)

With respect to a test cloth, the water repellency was evaluated in accordance with the spray test in JIS L1092-1998. The water repellency is represented by five grades of from 1 to 5. The higher the grade number, the better the water repellency. A test cloth with a grade 3 or higher is considered to have water repellency. A grade having +(−) attached shows that the property is slightly better (worse) than the standard property of that grade.

(Wash Durability)

With respect to a test cloth, washing was repeated 20 times or 50 times in accordance with water washing method in JIS L 0217 appendix 103. After washing, the test cloth was air-dried in a room at a temperature of 25° C. under a humidity of 60% overnight, whereupon the water repellency was evaluated as described above.

(Oil Repellency)

With respect to a test cloth, the oil repellency was evaluated in accordance with the test method in AATCC-TM118-1966. The oil repellency is represented by the grades as shown in Table 1. A grade having +(−) attached shows that the property is slight better (worse) than the standard property of that grade.

TABLE 1

| Oil repellency No. | Test solution | Surface tension (25° C.) [mN/m] |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | 65 Parts of nujol/ 35 parts of hexadecane | 29.6 |
| 1 | Nujol | 31.2 |
| 0 | Less than 1 | — |

(Wash Durability)

With respect to a test cloth, washing was repeated 20 times in accordance with water washing method in JIS L 0217 appendix 103. After washing, the test cloth was air-dried in a room at a temperature of 25° C. under a humidity of 60% overnight, whereupon the oil repellency was evaluated as described above.

(Penetration of Coating Liquid)

Using a colorimeter (CR310 manufactured by KONICA MINOLTA, INC.), before a moisture-permeable waterproofing film was formed, the brightness of the surface of a test cloth on a side on which a moisture-permeable waterproofing film would not be to be formed, was measured, and after a moisture-permeable waterproofing film was formed, the brightness of the surface of the test cloth on the side on which the moisture-permeable waterproofing film was not formed, was measured, and their reference (ΔL) was obtained.

(Peel Strength)

A heat seal tape was attached to the moisture-permeable waterproofing film of a test cloth by hot press. Using a Tensilon universal testing machine (AGS-X manufactured by Shimadzu Corporation), a force (peel strength) applied when a 2.5 cm of the tape was peeled was measured. Measurement was carried out three times in total, and the average of the peel strengths was obtained. The higher the peel strength, the less the moisture-permeable waterproofing film formed by the coating liquid is likely to be peeled.

<Abbreviations>

(Monomer)

CmFA: $F(CF_2)_mCH_2CH_2OC(O)CH=CH_2$ (a mixture of compounds wherein m is from 6 to 16, at least 99 mass % thereof are compounds wherein m is 8 or higher, and the average of m is 9),

FMA: $F(CF_2)_6CH_2CH_2OC(O)C(CH_3)=CH_2$,

VCM: vinyl chloride,

VDC: vinylidene chloride,

STA: stearyl acrylate,

BeA: behenyl acrylate,

BMA: n-butyl methacrylate,

MMA: methyl methacrylate

CHMA: cyclohexyl methacrylate,

DOM: dioctyl maleate,

D-BI: 3,5-dimethylpyrazole adduct of 2-isocyanateethyl methacrylate,

NMAM: N-methylolacrylamide,

HEMA: 2-hydroxyethyl methacrylate,

GMA: glycidyl methacrylate.

(Surfactant (D))

PEO-20: a 10 mass % aqueous solution of polyoxyethylene oleyl ether (ethylene oxide about 26 mol adduct) (Emulgen E430 manufactured by Kao Corporation), PEO-13: 10 mass % aqueous solution of polyoxyethylene oleyl ether (ethylene oxide about 13 mol adduct) (Emulgen E420 manufactured by Kao Corporation), SFY: 10 mass % aqueous solution of 2,4,7,9-tetramethyl-5-decyne-4,7-diol ethylene oxide adduct (30 mols of ethylene oxide added) (Surfynol 485 manufactured by Nissin Chemical Industry Co., Ltd.), P204: 10% aqueous solution of ethylene oxide propylene oxide polymer (containing 40 mass % of ethylene oxide) (PRONONE 204 manufactured by NOF Corporation)

AM3130: a 10 mass % aqueous solution of coconut oil fatty acid amidepropyldimethylaminoacetic acid betain, AM301: a 10 mass % aqueous solution of lauryl dimethylaminoacetic acid betain, TMAC: a 10 mass % aqueous solution of tirmethylammonium chloride (ARQUAD 18-63 manufactured by Lion Corporation).

(Medium (C))

DPG: dipropylene glycol

Water: deionized water (Molecular Weight-controlling Agent)

nDoSH: n-dodecylmercaptan,

StSH: Stearyl mercaptan (Polymerization Initiator)

VA061A: a 10 mass % aqueous solution of 2,2'-azobis[2-(2-imidazolin-2-yl)propane]acetate, V-50: a 10 mass % aqueous solution of 2,2'-azobis(2-methylpropionamidine)dihydrochloride.

(Additives)

KB1000: silicone softening agent (HISOFTER KB1000 manufactured by Meisei Chemical Works, Ltd.), DP9C: blocked isocyanate (Trixene DP9C/214 manufactured by Baxenden), TP-10: blocked isocyanate (MEIKANATE TP-10 manufactured by Meisei Chemical Works, Ltd.), M-3: melamine resin (BECKAMINE M-3 manufactured by DIC Corporation), ACX: crosslinking catalyst (ACCELERATOR ACX manufactured by DIC Corporation).

<Preparation of Copolymer>

(Copolymer (A))

Ex. 1

218 g of FMA, 3 g of HEMA, 109 g of PEO-13, 96 g of AM3130, 82 g of DPG, 239 g of water and 0.3 g of StSH were put into a glass beaker, heated at 60° C. for 30 minutes, and then mixed by a homomixer (BIO MIXER manufactured by Nihonseiki Kaisha, Ltd.) to obtain a mixture.

The mixture was treated by a high-pressure emulsification equipment (Mini-Lab manufactured by APV Ranie) at 60° C. under 40 MPa to obtain an emulsion. The obtained emulsion was put into a stainless steel reactor and cooled to 40° C. or below. 1.3 g of V-50 was added, the gas phase was replaced with nitrogen, and 49 g of VDC was introduced, and then the reaction mixture was heated to 60° C. for 15 hours with stirring to carry out a polymerization reaction to obtain an emulsion of copolymer (A–1). The solid content was 36.1 mass %. The amounts of the materials charged are shown in Table 2. The proportion of the monomer units, the amount of addition of the molecular weight-controlling agent and the molecular weight are shown in Table 3.

TABLE 2

| Amount charged (g) | Ex. 1 |
|---|---|
| FMA | 218 |
| STA | |
| BeA | |
| BMA | |
| MMA | |
| CHMA | |
| DOM | |
| D-BI | |
| NMAM | |
| HEMA | 3 |
| GMA | |
| PEO-20 | |
| PEO-13 | 109 |
| SFY | |
| P204 | |
| AM3130 | 96 |
| AM301 | |
| TMAC | |
| DPG | 82 |
| Water | 239 |
| nDoSH | |
| StSH | 0.3 |
| Amount of emulsion charged (g) | 699.7 |
| VCM | |
| VDC | 49 |
| VA061A | |
| V-50 | 1.3 |
| Solid content (mass %) | 36.9 |
| Copolymer | A-1 |

TABLE 3

| Monomer units (mass %) | Ex. 1 |
|---|---|
| FMA | 80 |
| VCM | |
| VDC | 19 |
| STA | |
| BeA | |
| BMA | |
| CHMA | |
| DOM | |
| D-BI | |
| NMAM | |
| HEMA | 1 |
| GMA | |
| nDoSH | |
| StSH | 0.1 |
| Mn | 38,000 |
| Mw | 140,000 |
| Copolymer | A-1 |

(Copolymer (B))

Ex. 2 to 13

Emulsions of copolymers (B–1) to (B-3), (B'-4) to (B'-5), (B-6) to (B-9) and (B'-10) to (B'-12) were obtained in the same as in Ex. 1 except that the amounts of materials charged were changed as identified in Table 4. The timing of addition of VCM was the same as that of VDC. The amounts of the materials charged are shown in Table 4. The proportion of the monomer units and the amount of addition of the molecular weight-controlling agent are shown in Table 5.

TABLE 4

| Amount charged (g) | Ex. 2 | 3 | 4 | 5 | 6 | 7 |
|---|---|---|---|---|---|---|
| FMA | 4 | 2 | 4 | 115 | 110 | 5 |
| STA | | | | | | |
| BeA | | | | | | |
| BMA | | | 22 | | | |
| MMA | | | | | | |
| CHMA | | | | 77 | 69 | |
| DOM | | | | | | |
| D-BI | 3 | 2 | 3 | | | 4 |
| NMAM | | | | | | |
| HEMA | 3 | 2 | 3 | | | 4 |
| GMA | 11 | 6 | 11 | 82 | 69 | |
| PEO-20 | 54 | | 54 | 110 | 110 | 54 |
| PEO-13 | | 24 | | | | |
| SFY | | | | | | |
| P204 | | | | 27 | 27 | |
| AM3130 | | | | 14 | 14 | |
| AM301 | | 21 | | | | |
| TMAC | 16 | | 16 | | | 16 |
| DPG | 33 | 18 | 33 | 82 | 82 | 33 |
| Water | 587 | 677 | 587 | 290 | 290 | 587 |
| nDoSH | | | | | | |
| StSH | 0.5 | 0.3 | 0.5 | 1.1 | 1.1 | 0.5 |
| Amount of emulsion charged (g) | 668.5 | 704.7 | 688.5 | 749.2 | 723.2 | 659.5 |
| VCM | 81 | | 61 | | 26 | 90 |
| VDC | | 45 | | | | |
| VA061A | 0.5 | 0.3 | 0.5 | 0.8 | 0.8 | 0.5 |
| V-50 | | | | | | |
| Solid content (mass %) | 14.6 | 8.1 | 14.6 | 36.5 | 36.5 | 14.6 |
| Copolymer | B-1 | B-2 | B-3 | B'-4 | B'-5 | B-6 |

TABLE 4-continued

| Amount charged (g) | Ex. 8 | 9 | 10 | 11 | 12 | 13 |
|---|---|---|---|---|---|---|
| FMA | | 4 | 5 | 203 | 47 | 138 |
| STA | | | | 19 | | 127 |
| BeA | | | | | 158 | |
| BMA | | | | | | |
| MMA | | | | | | |
| CHMA | | | | | | |
| DOM | | | | | 11 | |
| D-BI | 3 | | | 11 | | 6 |
| NMAM | | | 4 | | | 6 |
| HEMA | 3 | 3 | 4 | | 3 | |
| GMA | 11 | 11 | | | | |
| PEO-20 | 54 | 54 | 54 | 85 | 83 | |
| PEO-13 | | | | | | |
| SFY | | | | | | 83 |
| P204 | | | | 25 | 14 | |
| AM3130 | | | | | | |
| AM301 | | | | | | |
| TMAC | 16 | 16 | 16 | 25 | 14 | 28 |
| DPG | 33 | 33 | 33 | 82 | 83 | 83 |
| Water | 587 | 587 | 587 | 304 | 328 | 328 |
| nDoSH | | | | 2.7 | 2.8 | 2.1 |
| StSH | 0.5 | 0.5 | 0.5 | | | |
| Amount of emulsion charged (g) | 664.5 | 665.5 | 659.5 | 709.7 | 696.3 | 749.3 |
| VCM | 85 | 84 | 90 | 39 | 53 | |
| VDC | | | | | | |
| VA061A | 0.5 | 0.5 | 0.5 | 1.3 | 0.7 | 0.7 |
| V-50 | | | | | | |
| Solid content (mass %) | 14.6 | 14.6 | 14.6 | 36.5 | 36.3 | 36.2 |
| Copolymer | B-7 | B-8 | B-9 | B'-10 | B'-11 | B'-12 |

TABLE 5

| Monomer units (mass %) | Ex. 2 | 3 | 4 | 5 | 6 | 7 | 8 | 9 | 10 | 11 | 12 | 13 |
|---|---|---|---|---|---|---|---|---|---|---|---|---|
| FMA | 4 | 4 | 4 | 42 | 40 | 5 | | 4 | 4 | 74 | 17 | 50 |
| VCM | 80 | | 60 | | 10 | 88.4 | 83.4 | 82.6 | 89.4 | 15 | 20.5 | |
| VDC | | 80 | | | | | | | | | | |

TABLE 5-continued

| Monomer units (mass %) | Ex. 2 | 3 | 4 | 5 | 6 | 7 | 8 | 9 | 10 | 11 | 12 | 13 |
|---|---|---|---|---|---|---|---|---|---|---|---|---|
| STA | | | | | | | | | | 7 | | 46 |
| BeA | | | | | | | | | | | 57.5 | |
| BMA | | | 20 | | | | | | | | | |
| CHMA | | | | 28 | 25 | | | | | | | |
| DOM | | | | | | | | | | | 4 | |
| D-BI | 3 | 3 | 3 | | | 3.3 | 3.1 | | | 4 | | 2 |
| NMAM | | | | | | | | | 3.3 | | | 2 |
| HEMA | 3 | 3 | 3 | | | 3.3 | 3.1 | 3.1 | 3.3 | | 1 | |
| GMA | 10 | 10 | 10 | 30 | 25 | | | 10.4 | 10.3 | | | |
| nDoSH | | | | | | | | | | 1 | 1 | 0.75 |
| StSH | 0.5 | 0.5 | 0.5 | 0.4 | 0.4 | 0.5 | 0.5 | 0.5 | 0.5 | | | |
| Copolymer | B-1 | B-2 | B-3 | B'-4 | B'-5 | B-6 | B-7 | B-8 | B-9 | B'-10 | B'-11 | B'-12 |

<Preparation of Water/Oil Repellent Composition and Treatment of Cloth>

Ex. 14 to 17

The emulsion of the copolymer (A) and the emulsion of the copolymer (B) as shown in Table 6 were mixed in a mass ratio as shown in Table 6 and diluted with water to adjust the solid content concentration to be 1.2 mass %, and additives as shown in Table 6 were added at concentrations shown in Table 6 to obtain a water/oil repellent composition.

A base cloth (nylon high density taffeta) was dipped in the water/oil repellent composition by a padding method and nipped to a wet pick-up of 52 mass %. The cloth was dried at 110° C. for 90 seconds and at 170° C. for 60 seconds, and left in a room at 25° C. under a humidity of 60% overnight to obtain a test cloth.

50 g of RESAMINE CU-4700 (manufactured by Dainichiseika Color & Chemicals Mfg. Co., Ltd., urethane prepolymer), 0.5 g of CORONATE HL (manufactured by Nippon Polyurethane Industry Co., Ltd.), 1.0 g of SEIKASEVEN ALT #8000 (manufactured by Dainichiseika Color & Chemicals Mfg. Co., Ltd.) and 25 g of DMF were mixed to obtain a coating liquid.

The coating liquid was applied to the rear side of the test cloth using an applicator (RK Print Coat Instruments Ltd.) under conditions of a coating rate of 0.1 m/sec and a coating liquid temperature of 35° C. so that the thickness after drying would be 40 μm. The coated test cloth was left at rest for 1 minute, dipping in water at 20° C. for 2 minutes and then dipped in water at 40° C. for 2 minutes, and dried at 120° C. for 60 seconds to prepare a test cloth with a moisture-permeable waterproofing film. This test cloth was evaluated. The results are shown in Table 6.

TABLE 6

| | | Ex. 14 | 15 | 16 | 17 |
|---|---|---|---|---|---|
| Copolymer (A) | Type | A-1 | A-1 | A-1 | A-1 |
| | (mass %) | 100 | 80 | 80 | 80 |
| Copolymer (B) | Type | | B-1 | B'-5 | B'-4 |
| | (mass %) | | 20 | 20 | 20 |
| Additives (mass %) | KB1000 | | | | |
| | DP9C | 0.5 | 0.5 | 0.5 | 0.5 |
| | TP-10 | | | | |
| | M-3 | 0.3 | 0.3 | 0.3 | 0.3 |
| | ACX | 0.3 | 0.3 | 0.3 | 0.3 |

TABLE 6-continued

| | | Ex. 14 | 15 | 16 | 17 |
|---|---|---|---|---|---|
| Water repellency | Initial | 5 | 5 | 5 | 5 |
| | Wash 20 times | 4 | 3+ | 4 | 4 |
| | Wash 50 times | 3++ | 3+ | 3++ | 3++ |
| Oil repellency | Initial | 3− | 3 | 3 | 3 |
| | Wash 20 times | 2 | 2+ | 2+ | 2+ |
| Coating applicability | Penetration (ΔL) | 0.5 | 0.5 | 0.5 | 0.4 |
| | Peel strength (N) | 6 | 8 | 4 | <1 |

Ex. 14 to 17 are Examples to show the effect by addition of the copolymer (B) to the copolymer (A). From the results in Ex. 14 and 15, it is found that the peel strength of the moisture-permeable waterproofing film is increased when the copolymer (B) within the range of the present invention is added to the copolymer (A). From the results in Ex. 16 and 17, it is found that the peel strength of the moisture-permeable waterproofing film is decreased if the copolymer (B') out of the range of the present invention is added to the copolymer (A).

Ex. 18 to 26

The emulsion of the copolymer (A) and the emulsion of the copolymer (B) as shown in Table 7 were mixed in a mass ratio as shown in Table 7 and diluted with water to adjust the solid content concentration to be 1.2 mass %, and additives as shown in Table 7 are added at concentrations as shown in Table 7 to obtain a water/oil repellent composition.

In the same manner as in Ex. 14 to 17, a base cloth (nylon high density taffeta) was treated with the water/oil repellent composition to obtain a test cloth.

In Ex. 18 to 21, a test cloth with a moisture-permeable waterproofing film was obtained in the same manner as in Ex. 14 to 17. Further, in Ex. 22 to 26, a test cloth with a moisture-permeable waterproofing film was obtained in the same manner as in Ex. 14 to 17 except that the coated test cloth was left at rest for 5 minutes. The obtained test cloths were evaluated. The results are shown in Table 7.

TABLE 7

| | | Ex. | | | | | | | | |
|---|---|---|---|---|---|---|---|---|---|---|
| | | 18 | 19 | 20 | 21 | 22 | 23 | 24 | 25 | 26 |
| Copolymer (A) | Type | A-1 | A-1 | A-1 | A-1 | A-1 | A-1 | A-1 | A-1 | A-1 |
| | (mass %) | 100 | 80 | 80 | 80 | 80 | 80 | 80 | 80 | 80 |
| Copolymer (B) | Type | | B'-10 | B'-11 | B'-12 | B-1 | B-6 | B-7 | B-8 | B-9 |
| | (mass %) | | 20 | 20 | 20 | 20 | 20 | 20 | 20 | 20 |
| Additives (mass %) | KB1000 | 1.5 | 1.5 | 1.5 | 1.5 | 1.5 | 1.5 | 1.5 | 1.5 | 1.5 |
| | DP9C | 0.5 | 0.5 | 0.5 | 0.5 | 0.5 | 0.5 | 0.5 | 0.5 | 0.5 |
| | TP-10 | | | | | | | | | |
| | M-3 | 0.3 | 0.3 | 0.3 | 0.3 | 0.3 | 0.3 | 0.3 | 0.3 | 0.3 |
| | ACX | 0.3 | 0.3 | 0.3 | 0.3 | 0.3 | 0.3 | 0.3 | 0.3 | 0.3 |
| Water repellency | Initial | 4+ | 4+ | 4+ | 4+ | 4+ | 4+ | 4+ | 4+ | 4+ |
| | Wash 20 times | 3 | 3 | 3 | 2+ | 3 | 3 | 3 | 3+ | 3+ |
| | Wash 50 times | 3 | 2 | 2 | 2 | 3− | 3− | 3− | 3 | 3 |
| Oil repellency | Initial | 3− | 3 | 2 | 2 | 3− | 3− | 3− | 3− | 3− |
| | Wash 20 times | 2− | 2− | 1 | 1 | 2− | 2− | 2− | 1+ | 1+ |
| Coating applicability | Penetration (ΔL) | 0.9 | 0.7 | 1.1 | 0.7 | 1.6 | 1.4 | 1.2 | 1.3 | 1.1 |
| | Peel strength (N) | 3 | 5 | 3 | 2 | 7 | 7 | 7 | 7 | 7 |

Ex. 18 is an Example in which the copolymer (A) was used alone.

Ex. 19 to 21 are Examples in which a known water/oil repellent which presents a low environmental impact was added to the copolymer (A). From the results in Ex. 18 to 21, it is found that the peel strength of the moisture-permeable waterproofing film is not significantly improved even if each of copolymers (B'-10) to (B'-12) which are known water/oil repellents is added.

Ex. 22 to 26 are Examples to show the effect by addition of the copolymer (B) to the copolymer (A). From the results in Ex. 22 to 26, it is found that when the copolymer (B) within the range of the present invention is added to the copolymer (A), penetration of the coating liquid is slightly increased due to influence by the long time for leaving the coated test cloth at rest, however the peel strength of the moisture-permeable waterproofing film is increased.

Ex. 27 to 37

The emulsion of the copolymer (A) and the emulsion of the copolymer (B) as shown in Table 8 or 9 were mixed in a mass ratio as shown in Table 8 or 9 and diluted with water to adjust the solid content concentration to be 1.2 mass %, and additives as shown in Table 8 or 9 were added at concentrations as shown in Table 8 or 9 to obtain a water/oil repellent composition.

In the same manner as in Ex. 14 to 17, a base cloth (nylon high density taffeta) was treated with the water/oil repellent composition to obtain a test cloth.

A test cloth with a moisture-permeable waterproofing film was obtained in the same manner as in Ex. 14 to 17 except that the thickness after drying was 10 μm, and the coated test cloth was left at rest for 5 minutes. The obtained test cloths were evaluated. The results are shown in Tables 8 and 9.

TABLE 8

| | | Ex. | | | | | | | |
|---|---|---|---|---|---|---|---|---|---|
| | | 27 | 28 | 29 | 30 | 31 | 32 | 33 | 34 |
| Copolymer (A) | Type | A-1 | A-1 | A-1 | A-1 | A-1 | A-1 | A-1 | A-1 |
| | (mass %) | 100 | 90 | 80 | 70 | 60 | 90 | 80 | 70 |
| Copolymer (B) | Type | | B-1 | B-1 | B-1 | B-1 | B-2 | B-2 | B-2 |
| | (mass %) | | 10 | 20 | 30 | 40 | 10 | 20 | 30 |
| Additives (mass %) | KB1000 | 1.5 | 1.5 | 1.5 | 1.5 | 1.5 | 1.5 | 1.5 | 1.5 |
| | DP9C | | | | | | | | |
| | TP-10 | 0.5 | 0.5 | 0.5 | 0.5 | 0.5 | 0.5 | 0.5 | 0.5 |
| | M-3 | 0.3 | 0.3 | 0.3 | 0.3 | 0.3 | 0.3 | 0.3 | 0.3 |
| | ACX | 0.3 | 0.3 | 0.3 | 0.3 | 0.3 | 0.3 | 0.3 | 0.3 |
| Water repellency | Initial | 4+ | 5− | 5− | 4+ | 4+ | 4+ | 4+ | 5− |
| | Wash 20 times | 4 | 4 | 4 | 3+ | 2 | 4 | 4 | 4 |
| | Wash 50 times | 3+ | 3+ | 3+ | 3 | 2 | 3+ | 3+ | 3 |
| Oil repellency | Initial | 3− | 3− | 2+ | 2+ | 2 | 2+ | 2+ | 2+ |
| | Wash 20 times | 2 | 2+ | 2 | 1+ | 1− | 1+ | 2− | 2− |
| Coating applicability | Penetration (ΔL) | 2.6 | 2.5 | 2.5 | 2.9 | 3.4 | 2.1 | 2.1 | 2.2 |
| | Peel strength (N) | 3 | 6 | 6 | 6 | 7 | 6 | 5 | 5 |

TABLE 9

| | | Ex. | | | |
|---|---|---|---|---|---|
| | | 27 | 35 | 36 | 37 |
| Copolymer (A) | Type | A-1 | A-1 | A-1 | A-1 |
| | (mass %) | 100 | 90 | 80 | 70 |
| Copolymer (B) | Type | | B-3 | B-3 | B-3 |
| | (mass %) | | 10 | 20 | 30 |
| Additives (mass %) | KB1000 | 1.5 | 1.5 | 1.5 | 1.5 |
| | DP9C | | | | |
| | TP-10 | 0.5 | 0.5 | 0.5 | 0.5 |
| | M-3 | 0.3 | 0.3 | 0.3 | 0.3 |
| | ACX | 0.3 | 0.3 | 0.3 | 0.3 |
| Water repellency | Initial | 4+ | 5− | 5− | 4+ |
| | Wash 20 times | 4 | 4 | 3+ | 3+ |
| | Wash 50 times | 3+ | 3+ | 3 | 3 |
| Oil repellency | Initial | 3− | 2+ | 2+ | 2 |
| | Wash 20 times | 2 | 1+ | 2 | 2− |
| Coating applicability | Penetration (ΔL) | 2.6 | 2.4 | 2.4 | 2.6 |
| | Peel strength (N) | 3 | 6 | 5 | 6 |

Ex. 27 is an Example in which the copolymer (A) was used alone.

Ex. 28 to 37 are Examples in which the mass ratio of the copolymer (A) to the copolymer (B) was changed. From the results in Ex. 28 to 37, it is found that the balance between suppression of penetration of the coating liquid and the peel strength of the moisture-permeable waterproofing film is favorable within a range of the proportion of the copolymer (A) being from 70 to 90 mass % and the proportion of the copolymer (B) being from 10 to 30 mass %.

INDUSTRIAL APPLICABILITY

The water/oil repellent composition of the present invention is useful as a water/oil repellent for e.g. cloth (woven fabric, textile fabric, nonwoven fabric, etc.), various fiber products (clothing (sports wears, coats, jumpers, work clothes, uniforms, etc.), bags, industrial materials, etc.).

This application is a continuation of PCT Application No. PCT/JP2013/070512 filed on Jul. 29, 2013, which is based upon and claims the benefit of priority from Japanese Patent Application No. 2012-171133 filed on Aug. 1, 2012. The contents of those applications are incorporated herein by reference in their entireties.

What is claimed is:

1. A water/oil repellent composition which comprises a copolymer (A) having from 60 to 95 mass % of units based on the following monomer (a1) and from 5 to 40 mass % of units based on the following monomer (a2),
a copolymer (B) having from 50 to 95 mass % of units based on the following monomer (b1) and from 5 to 50 mass % of units based on the following monomer (b2), and
a medium (C),
wherein the proportion of the copolymer (A) is from 70 to 90 mass %, and the proportion of the copolymer (B) is from 10 to 30 mass % relative to the total amount (100 mass %) of the copolymer (A) and the copolymer (B):
monomer (a1): a compound represented by the following formula (1):

$$(Z-Y)_nX \quad (1)$$

wherein Z is a $C_{1-6}$ polyfluoroalkyl group or a group represented by the following formula (2), Y is a bivalent organic group having no fluorine atom, or a single bond, n is 1 or 2, and X is, when n is 1, any one of the groups represented by the following formulae (3-1) to (3-5) and, when n is 2, any one of the groups represented by the following formulae (4-1) to (4-4):

$$C_iF_{2i+1}O(CFX^1CF_2O)_jCFX^2- \quad (2)$$

wherein i is an integer of from 1 to 6, j is an integer of from 0 to 10, and each of $X^1$ and $X^2$ is a fluorine atom or a trifluoromethyl group;

$$-CR^2=CH_2 \quad (3-1)$$

$$-C(O)OCR^2=CH_2 \quad (3-2)$$

$$-OC(O)CR^2=CH_2 \quad (3-3)$$

$$-OCH_2-\phi-CR^2=CH_2 \quad (3-4)$$

$$-OCH=CH_2 \quad (3-5)$$

wherein $R^2$ is a hydrogen atom, a methyl group or a halogen atom, and $\phi$ is a phenylene group;

$$-CH[-(CH_2)_mCR^3=CH_2]- \quad (4-1)$$

$$-CH[-(CH_2)_mC(O)OCR^3=CH_2]- \quad (4-2)$$

$$-CH[-(CH_2)_mOC(O)CR^3=CH_2]- \quad (4-3)$$

$$-OC(O)CH=CHC(O)O- \quad (4-4)$$

where $R^3$ is a hydrogen atom, a methyl group or a halogen atom, and m is an integer of from 0 to 4;
monomer (a2): vinylidene chloride;
monomer (b1): a halogenated olefin; and
monomer (b2): a monomer having no polyfluoroalkyl group and having a crosslinkable functional group.

2. The water/oil repellent composition according to claim 1, wherein Z is a $C_{4-6}$ perfluoroalkyl group.

3. The water/oil repellent composition according to claim 1, wherein Y is a $C_{2-4}$ alkylene group, n is 1, and X is a group represented by the formula (3-3).

4. The water/oil repellent composition according to claim 1, wherein the copolymer (A) further has units based on the following monomer (a3):
monomer (a3): a monomer having no polyfluoroalkyl group and having a crosslinkable functional group.

5. The water/oil repellent composition according to claim 4, wherein the crosslinkable functional group in the monomer (a3) is a hydroxyl group, a blocked isocyanate group, an amino group, a N-hydroxymethylamide group, an epoxy group or a carboxy group.

6. The water/oil repellent composition according to claim 4, wherein the copolymer (A) has from 65 to 89.9 mass % of the units based on the monomer (a1), from 10 to 34.9 mass % of the units based on the monomer (a2) and from 0.1 to 25 mass % of the units based on the monomer (a3).

7. The water/oil repellent composition according to claim 1, wherein the monomer (b1) is vinyl chloride.

8. The water/oil repellent composition according to claim 1, wherein the copolymer (B) further has units based on a monomer (b3) which is a monomer other than the monomer (b1) and the monomer (b2).

9. The water/oil repellent composition according to claim 8, wherein the monomer (b3) is the monomer (a1) or a monomer having a $C_{1-22}$ alkyl group.

10. The water/oil repellent composition according to claim 8, wherein the proportion of the units based on the monomer (b3) is from 2 to 40 mass % relative to the units (100 mass %) based on all the monomers in the copolymer (B).

11. An article having a porous substrate, wherein the porous substrate has a water/oil repellent-treated surface treated with the water/oil repellent composition as defined in claim 1 on at least one side, and has a moisture-permeable waterproofing film on one side.

12. The article according to claim 11, wherein the porous substrate is cloth.

13. A method for producing a porous substrate having a water/oil repellent-treated surface and a moisture-permeable waterproofing film, which comprises treating at least one side of a porous substrate with the water/oil repellent composition as defined in claim 1 to form the water/oil repellent-treated surface and then applying a coating liquid containing a material of the moisture-permeable waterproofing film to one side of the porous substrate to form the moisture-permeable waterproofing film.

\* \* \* \* \*